June 8, 1954
W. A. HARJU ET AL
2,680,480
VERTICAL SLAT VENETIAN BLIND
Filed Dec. 6, 1950
5 Sheets-Sheet 2
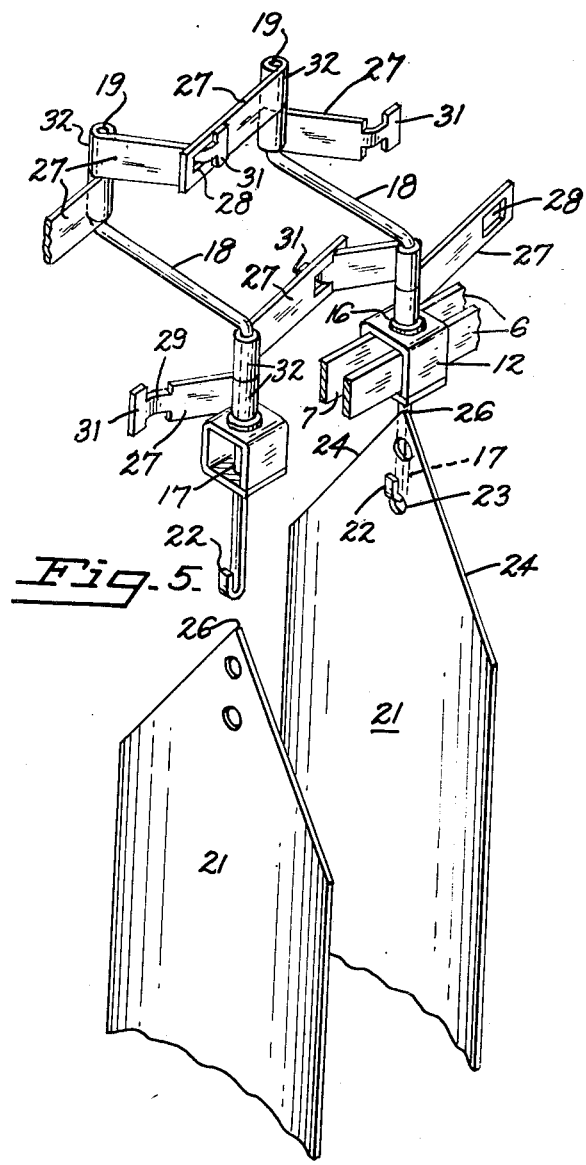
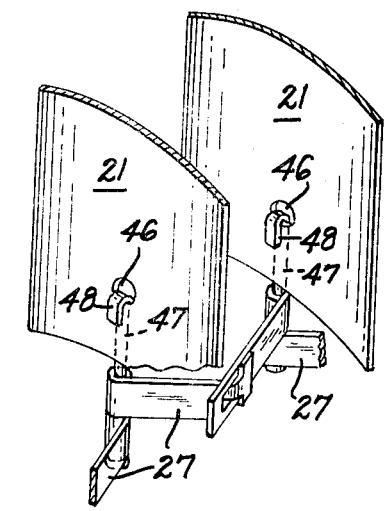
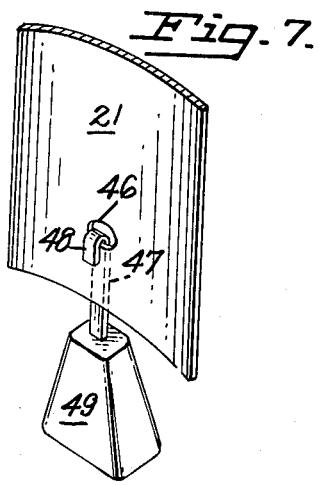
INVENTORS
WALTER A. HARJU
WILLIAM B. CRUMP
BY
*George B. White*
ATTORNEY

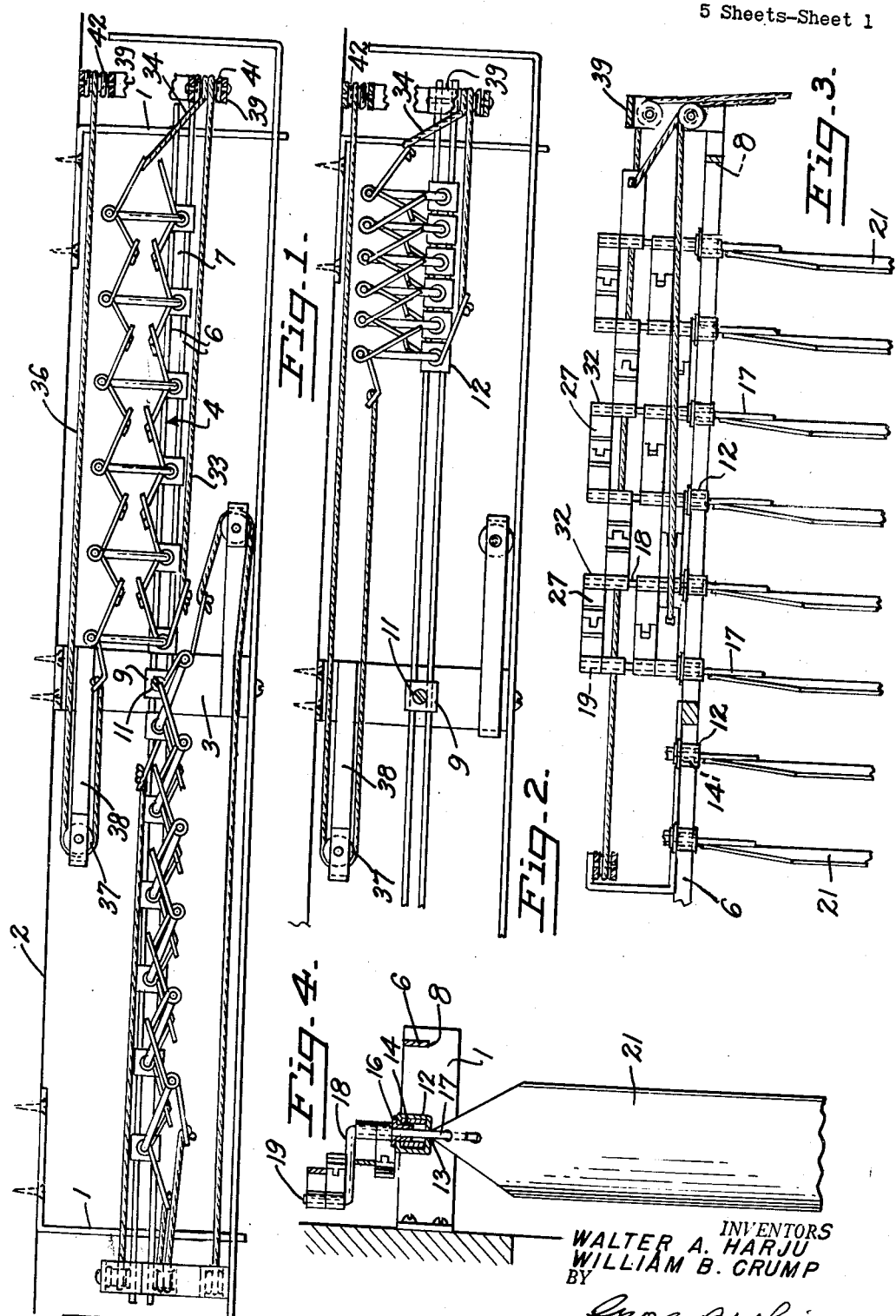

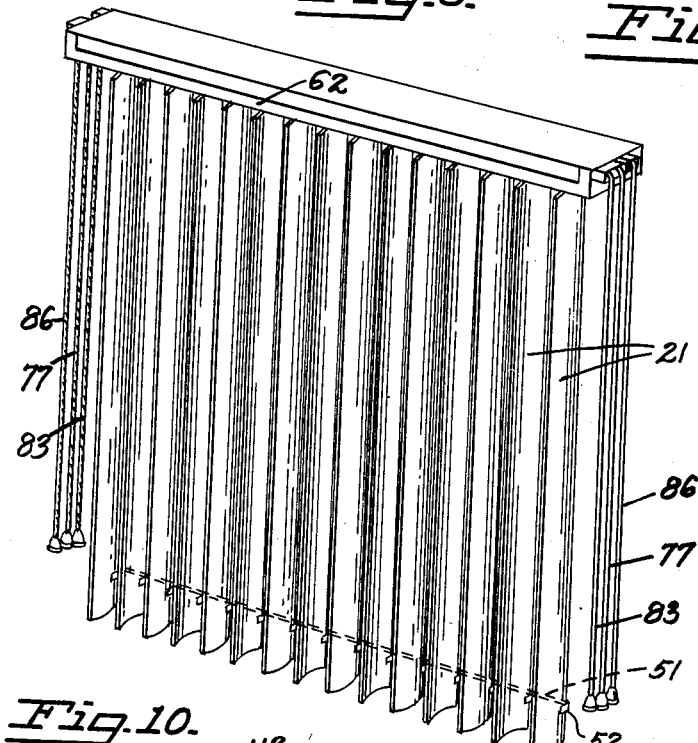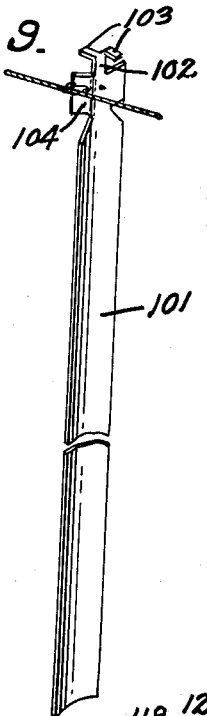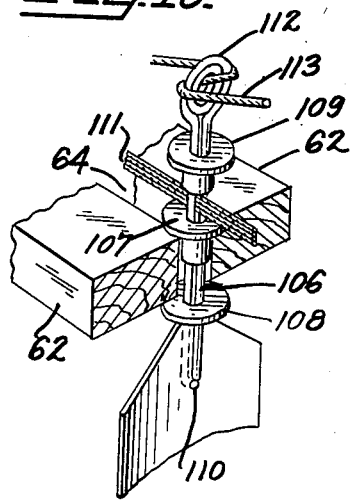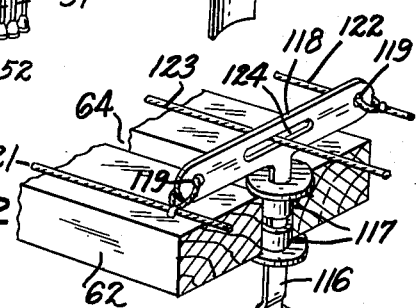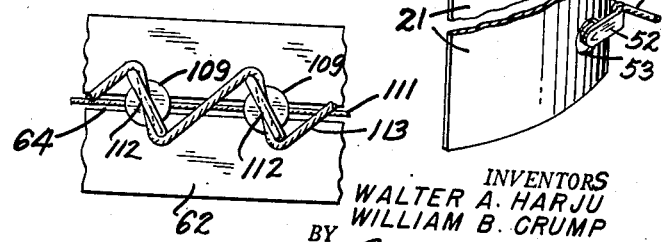

June 8, 1954
W. A. HARJU ET AL
2,680,480
VERTICAL SLAT VENETIAN BLIND
Filed Dec. 6, 1950
5 Sheets-Sheet 4
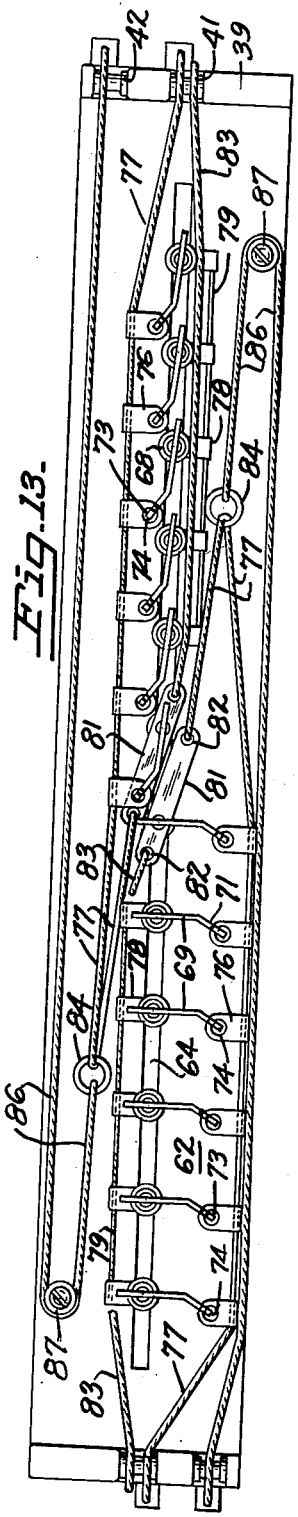
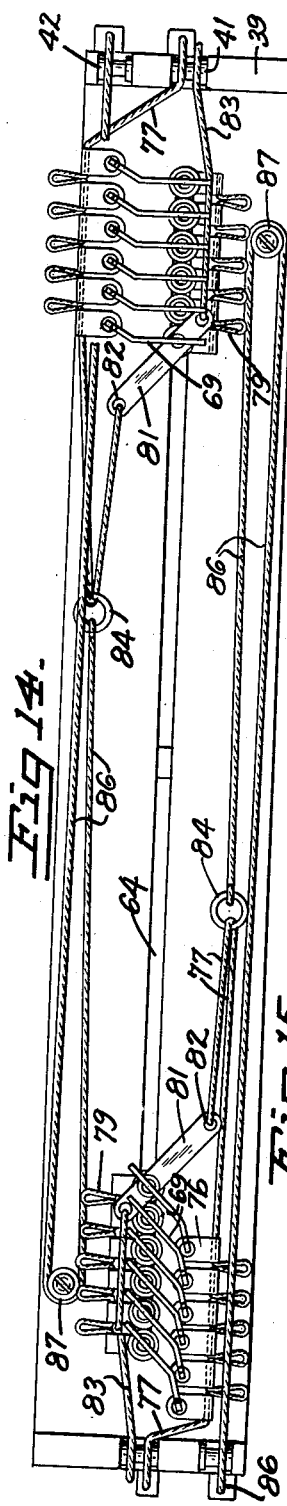
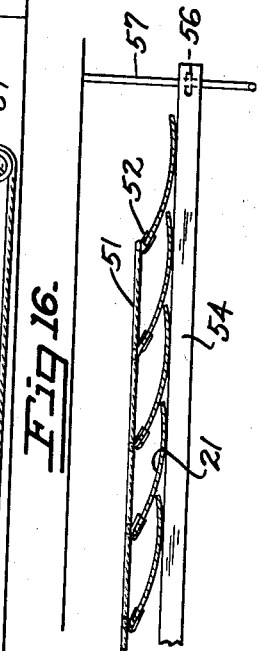
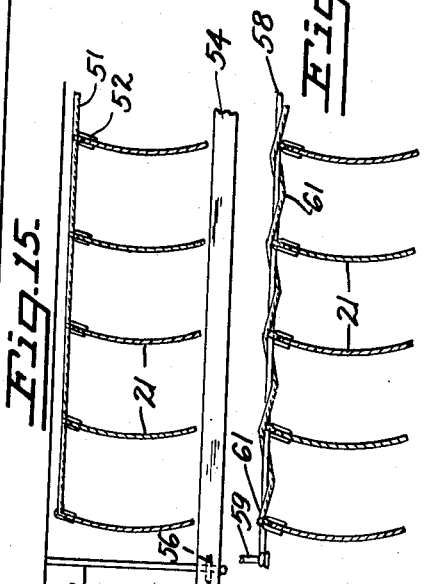
INVENTORS
WALTER A. HARJU
WILLIAM B. CRUMP
BY
George B. White
ATTORNEY

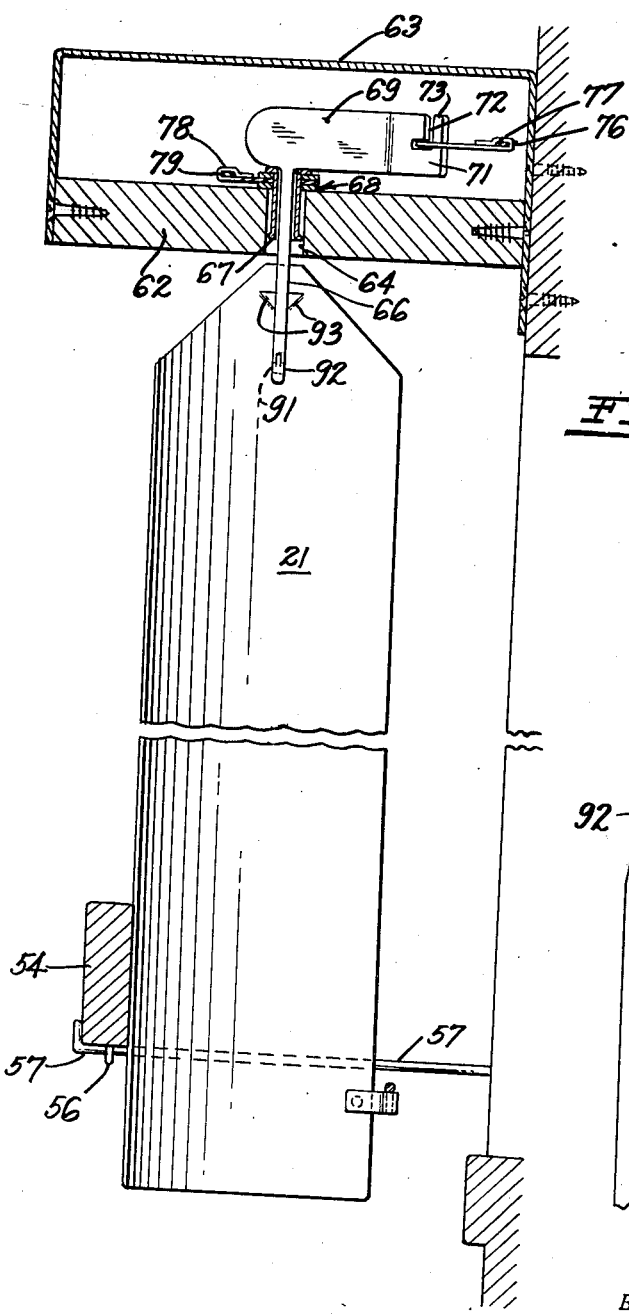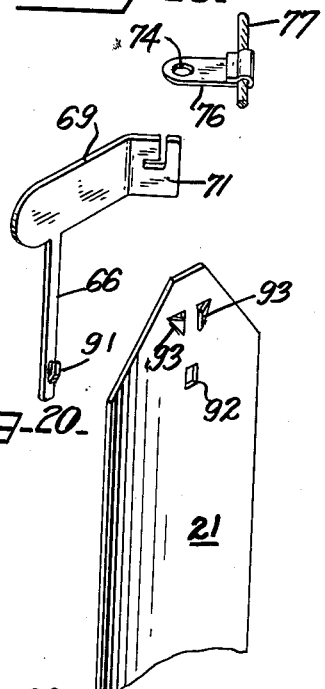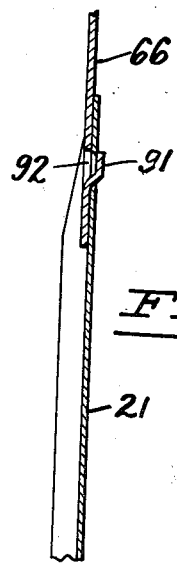

Patented June 8, 1954

2,680,480

UNITED STATES PATENT OFFICE 2,680,480

VERTICAL SLAT VENETIAN BLIND

Walter A. Harju and William B. Crump, Mountain View, Calif.

Application December 6, 1950, Serial No. 199,422

5 Claims. (Cl. 160—172)

This invention relates to Venetian blinds with vertically suspended slats.

The primary object of the invention is to provide a device for suspending slats of so called Venetian blinds vertically from an overhead bracket and track, so that the slats are pivoted about a generally vertical axis and are also slidable on a generally horizontal track above an opening on a building, such as a window or door opening; and a device for easily manipulating the slats for desirable positions and angular adjustments without interfering with said opening.

The features of our vertical slat Venetian blind include: an overhead bracket and track, light vertical slats of concavo-convex cross section having pointed tips at the top to facilitate overlapping position in substantially the same plane, a suspending device on said tapered tip pivotally and slidably supported on said track, a self adjustable device connecting said suspending devices of the slats for transmitting turning adjustments uniformly to all the slats and for permitting the gathering of the slats in a pack along a side of the opening or spreading said slats across and over said opening, manipulating lines with suitable connection to said adjustable connecting and transmitting device, and means at the bottoms of said slats to hold them in vertical suspended position at all times.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a plan view of the suspending and adjusting device for our Venetian blind, showing the slats on one half of the opening turned to open position and on the other half of said opening in overlapping closed position.

Fig. 2 is a fragmental plan view of the suspending and adjusting device showing the position in which the slats are gathered or packed at an edge of the opening.

Fig. 3 is a fragmental front view showing the slats in spread and open position.

Fig. 4 is a sectional side view of the device showing the suspension of a slat.

Fig. 5 is a perspective, partly sectional and partly development view showing the slats' attachment to the suspending and adjusting device.

Fig. 6 is a sectional, perspective view of the lower portion of a pair of slats and a form of self adjustable spacing device thereon.

Fig. 7 is a fragmental view of the lower portion of a slat with a weight hooked thereon.

Fig. 8 is a perspective, somewhat diagrammatic view of an assembled Venetian blind unit.

Fig. 9 is a perspective view of a slat with an integral suspending extension on its top.

Fig. 10 is a fragmental, sectional perspective view of another form of slat suspension.

Fig. 11 is a fragmental top plan view of said other form shown in Fig. 10.

Fig. 12 is another modified embodiment of our slat adjusting device.

Fig. 13 is a plan view of another modified embodiment of our slat suspending and adjusting device.

Fig. 14 is a plan view of the device shown in Fig. 13 with the slats gathered or packed at the edges of the opening.

Fig. 15 is a sectional plan view of the lower ends of the slats with a slat holder at the bottom when the slats are open.

Fig. 16 is a sectional plan view of the lower ends of the slats with a slat holder at the bottom when the slats are closed.

Fig. 17 is a sectional plan view showing another form of slat aligner at the bottom.

Fig. 18 is a sectional view of our device with said slat holder at the bottom.

Fig. 19 is a perspective detail view of a line holder element of our device.

Fig. 20 is a perspective view of another form of the sliding pivot.

Fig. 21 is a fragmental perspective view of the top of a slat.

Fig. 22 is a sectional fragmental view of the top of a slat.

In its general organization, as illustrated in the embodiment shown in Figures 1 to 7 inclusive, our invention includes a pair of spaced end brackets 1 on a backboard 2, or on the wall above an opening, and central flat bracket 3 intermediate between the end brackets 1 also secured to said backboard 2 or to said wall. A track 4 is supported on the brackets 1 and 3. The track 4 is formed of a pair of parallel flat bars 6 horizontally spaced from one another so as to form a downwardly open channel 7 therebetween. The bars 6 are held in vertical slots 8 in the end brackets 1. A central clamp 9 on the middle of the track 4 is held by a screw 11 on the middle bracket 3 to secure the track 4 in place and to act as the central abutment for the slidable slat supporting device on the opposite sides of the track 4.

The slidable and pivotal supporting device includes a plurality of sliding sleeves or blocks 12 on the track 4. Each sliding block has a vertical hole 13 therethrough aligned with the track channel 7. In each hole 13 is a freely rotating bushing 14 the head 16 of which rests on the top of the sliding block 12. A pivot shaft 17 is journalled in said bushing 14. On the top of the pivot shaft 17 and spaced from the top of the sliding block 12 is a bent portion forming a crank arm 18 with an upward pivot 19 on its outer end. The manipulating connections for the blind are located on said pivot shaft 17 and on said crank pivot 19 for turning the pivot shaft 17 or for drawing together or spreading the sliding blocks 12 along the track 4.

On the lower end of each pivot shaft 17 and spaced downwardly from the track 4 is suitably suspended a Venetian blind slat 21, which is preferably made of light metal and is of concavo-convex cross section. As shown in Fig. 5, the lower end of the pivot shaft 17 has a hook 22 thereon, which hooks into a hole 23 in the tip of the slat 21. The slat 21 has a tapered tip formed by converging side edges 24. The hole 23 is spaced from and aligned with the apex 26 of the tip of the slat 21.

The connecting devices for manipulation include a plurality of pairs of interlocking links 27. The links 27 pivoted on the crank arms 18 serve to turn the pivot shafts 17 and the slats 21 therewith. The links 27 on the pivot shaft 17 under the crank arms 18 serve to exert a pull on the shafts 17 to slide the sliding blocks 12 along the track 4.

There are two links 27 fulcrumed on each pivot shaft 17 and two links 27 on the pivot 19 on the end of each crank arm 18. The links 27 fulcrumed on the same fulcrum extend generally oppositely to one another, respectively toward the next adjacent sliding blocks 12.

For the interlocking of the pairs of connecting links 27, one of the links 27 has in it an elongated journal slot 28 near its free end, and the other link 27 of each pair has its end curved and notched on its opposite edges spaced from its free end to form a pivot neck 29 and a transverse head 31. This transverse head 31 of one link 27 is inserted into the slot 28 of the next link by tilting the first link and the head edgewise and when the slot 28 is on the neck 29, turning the first link 27 to its upright position. This provides a simple and secure pivotal connection without any additional parts but the links. Each series of links 27 on the crank pivot 19 and on the pivot shaft 17 includes links alternately with slots 28 and with head 31 at their ends, and alternate pairs of links 27 have their tubular fulcrum hubs 32 adjacent the crank arm 18 or spaced from the crank arm 18. In other words there are two fulcrum hubs 32 positioned end to end on each crank arm pivot 19 and on each pivot shaft 17.

For the manipulation of the blind a suitable pull cord 33 is secured to the last link 27 of the series of the pivot shaft 17, namely the link 27 nearest the middle bracket 3, so that when the cord 33 is pulled toward the edge of the opening it exerts a pull on the pivot shaft 17 and slides the last sliding block 12 toward said edge of said opening. It is to be noted that each link 27 is longer than half the distance between the centers of adjacent sliding blocks 12 so that each pair of links 27 converges at an angle to facilitate the folding and unfolding of the pairs of links 27 about their connecting pivots. The pairs of links 27 extend generally inwardly into the area between the pivot shaft 17 and the crank arm pivot 19.

As the outermost sliding block 12 is pulled by the cord 33 its links fold about their pivots and it abuts against and pushes the next block 12 along the track 4, thus gathering the blocks 12 and the slats 21 thereon into a pack.

Another cord 34 is secured to the link 27 on the crank arm pivot 19 nearest the edge of the opening at which the blind is packed. By pulling this turning cord 34 the crankarms 18 are turned uniformly in a clockwise direction viewing Fig. 2, and the pivot shafts 17 are turned therewith. It is to be noted that when the crank arms 18 are at right angles to the track 4 the slats 21 are fully open, namely the planes of the slats 21 are also at right angles to the plane of the building opening.

A third cord 36 is secured to the link 27 on the crank arm 18 nearest the center bracket 3 and is played over a pulley 37 on an arm 38 extended from the bracket 3 in a direction away from said nearest crank arm 18. Then this third cord 36 is extended back to the end bracket 1.

On the outer end of the track 4 is a journal bracket 39 on which are journalled a pair of pulleys 41 and 42. The first and second cords 33 and 34 are played over and hang down from the pulley 41, and the third cord 36 is over the other pulley 42.

In order to spread the Venetian blind over the opening along the track 4, the third cord 36 is pulled down so as to turn and pull the crank arms 18 and the pivot shafts 17 away from the adjacent end bracket 1. Then the slats 21 may be left closed. To turn the blind slats 21 to open position the second cord 34 is pulled to turn the crank arms 18 clockwise. To gather and pack the slats 18, the first cord 33 is pulled.

The entire overhead structure may be covered by a suitable cornice to conceal the track and working parts.

While generally the slats 21 hang vertically by themselves, in order to diminish flapping of the slats 21 means are provided to hold the bottom or lower ends of the slats 21. For this purpose a hole 46 is provided near the lower end of each slat 21. A stem 47 has a hook 48 at its end for hooking in each hole 46. These stems 47 extend below the bottoms of the slats 21 and, in the form shown in Fig. 6, are connected by links 27 in the same manner as the links 27 connect the top pivot shafts 17. Thus the relative movements of the bottom ends of the slats 21 are similar to the relative movements of the tops of the slats 21 and work in unison.

In the form shown in Fig. 7 each stem 47 has a suitable weight 49 thereon to exert a downward pull on the slat 21 and prevent flapping or swinging.

Another connection between the lower ends o the slats 21 is shown in the general perspectiv view in Fig. 8, wherein a horizontal cord 51 ex tends along the row of slats 21 and is secured to each slat by a suitable snap clamp 52. The manner of securing this clamp 52 over a hole 53 near an edge of the slat 21 is shown in the lower portion of Fig. 12.

In Figures 15, 16 and 18 is shown a bar 54 slidably supported by loops 56 on wire brackets 57 along the lower portions of the slats 21 to prevent the flapping of the slats 21. When the slats 21 are turned into overlapping closed position, as shown in Fig. 16, the bar 54 is shifted against the convex faces of the slats 21.

In Fig. 17 is shown a sliding guide and holder for the lower portions of the slats 21. A cord 58 is held taut on suitable end anchor pins 59 and forms a guide line. Another flexible cord 61 is wrapped around the taut cord 58 and is secured to the adjacent edges of the slats 21 in the manner above described in Figs. 8 and 12. Thus the slats 21 are held against flapping and are also guided on a straight line near their bottom as the blind is moved along its track 4.

The overhead adjusting and suspending structure shown in Figs. 13, 14 and 18 includes a base board 62 supported on suitable brackets 63. A longitudinal channel slot 64 forms a track. Each slat 21 is suspended on a pivot stem 66 which extends through the channel slot 64. A bushing 67 surrounds the portion of the stem 66 in said slot 64. The head of the bushing 67 rests on a washer 68 which latter in turn slidably rests on the top of the board 62. A head 69 extends to one side of the top of the stem 66 and rests on the head of the bushing 67. The end 71 of the head 69 is bent toward the direction in which the stems are pulled for gathering or packing the slats 21, as shown in Fig. 14. From the top edge of the end 71 extends a bayonet slot 72 and on the finger 73 formed by it is held the hole or loop 74 of a line clamp 76. The line clamps 76 are clamped at spaced intervals over a pull cord 77.

From each washer 68 extends a line clamp ear 78, toward the side opposite from the heads 69. The line clamp ears 78 are clamped at spaced intervals over a spacing cord 79.

On the outermost end stem 66 and above the head of the bushing 67 is pivoted a horizontal lever 81 having a hole 82 at each end thereof. Into the hole 82 on the side of the clamp ears 78 is secured a second pull cord 83 for the gathering or packing of the slats 21. Into the other or outer hole 82 is secured the end of the first pull cord 77. This outer end of the first pull cord 77 is looped around in a ring 84. A third pull cord 86 is secured into said ring 84 and is played around a pulley 87 spaced on the board 62 away from the outermost position of the last stem 66, and then returned to the edge of the opening. The pull cords 77 and 83 extend downwardly over an end pulley 88. The third pull cord 86 extends downwardly over another pulley 89 spaced from the first pulley 88.

In order to spread the slats over the opening the third pull cord 86 is pulled which through the ring 84 and the lever 81 pulls the stems 66 and slats thereon away from the end at which the slats are normally gathered or packed. The slats are gathered by pulling the second cord 83. The slats are turned to open position by pulling the first cord 77, and turned to closed position by pulling the third cord 86 when the slats are spread.

As shown in Figs. 18 and 21 the stem 66 is secured by a hook 91 on the stem 66 into a hole 92 at the top end of the slat and is held against relative lateral tilting by a pair of spaced prongs 93 above the hole 92, one on each side of the stem 66.

In the form shown in Fig. 9, the pivot and its engagement elements are formed integral with the slat 101. The pivot neck 102 is in the bushing 67 heretofore mentioned in Fig. 13, and is rotatable therewith. From the top of the pivot neck 102 are bent oppositely the ears 103 to which are connected the respective manipulating cords 77 and 79 respectively as heretofore described. A pull cord is connected to a side flange 104 of this slat 101.

In the form shown in Figs. 10 and 11 the pivot shaft is formed of a double stem substantially in the form of a cotter pin. The double stem 106 has on it a headed bushing 107 rotatably resting in the channel slot 64. A washer 108 on said stem 106 bears against the underside of the board 62 to prevent tilting of the pivot. Another bushing 109 is spaced above the first bushing 107 and between the bushings there is clamped within the double stem 106 a multiple strand cord 111 to function as a spacer cord similarly to the spacer cord 79 shown in Fig. 13. The lower end of one of the stems is provided with a hook 110 to engage a hole in the slat. The eye 112 on the top of the double stem 106 is engaged by a double action turning and pull cord 113. This cord 113 is threaded through said eye 112 from the outside around one side of the eye and then across the eye and from the inside around the opposite side of eye 112 in opposite directions, as shown in Figs. 10 and 11. The cord 113 is threaded through the entire series of eyes 112 so that it enters and leaves on the same sides of all said eyes 112. The ends of the cord 113 are connected in the unit the same way as the ends of the cord 77 in Fig. 13, so that in general the manipulation for turning, spreading and gathering the slats is similar.

In the form shown in Fig. 12 a flat stem 116 suitably secured to the tip of the slat extends through a pair of bushings 117 and through the channel slot 64. The respective heads of the bushings 117 slidably bear against the opposite faces of the base board 62. A cross head 118 on the top of each stem 116, has a hole 119 in each end thereof into one of which is secured a turning cord 121 which functions as the connecting cord 79 in Fig. 13. Another cord 122 is secured in the other holes 119 of the cross heads 118 which function similarly to cord 77 of Fig. 13. A third cord 123 extends through central slots 124 and is secured to the last cross head 118 of the series farthest from the edge of the opening to function similarly to cord 83 of Fig. 13.

In all the forms herein the description refers to one half of the double series or sets of slats for one opening such as shown in Fig. 1, because both sets are identical and work from the center to opposite edges of the opening, except that the hooks on the pivot stems are turned on one half oppositely to those on the other half of the double blind so as to hold the slats on both sides in alignment and normally facing in the same direction. In the event a single set of slats is used over an opening, then the half unit described suffices.

We claim:

1. A Venetian blind structure comprising, channeled guide way means adapted to be mounted across a building opening to be served by the blind structure, slat carriers supported on and being slidable along said guide way means, turnable slat suspending elements journalled in the respective carriers about vertical axes, crank members on said suspending elements for imparting turning motion to said members, a pair of pivoted links between each pair of adjacent elements, a pair of pivoted links between each pair of adjacent crank members, each of said pairs of links being disposed at an angle when said carriers are extended over said guide way means and being foldable upon one another as said carriers are stacked together, and maintaining lines connected to at least one of said suspending elements and crank members for respectively pulling and turning said suspending elements.

2. In a Venetian blind structure, a channel guide way means adapted to be mounted across a building opening to be served by the blind structure, a series of slat carriers supported on and being slidable along said channel guide way means, a slat suspending stem rotatably extended through and supported on each carrier and being adapted to suspend a blind slat thereon in perpendicular position, a crank arm on each stem, a pair of links journalled on each stem and extended in opposite directions generally toward the respective links extended from stems on the opposite sides of said first stem, a pair of links journalled on each crank arm on a generally vertical axis and extended generally toward the links extended from the next adjacent crank arm on each side of said first crank arm, the respective links extended toward one another being pivoted together to form foldable connections, line guides for manipulating lines at an end of said guide way means, a line connected to the stem farthest from said line guides and extended over said guides, a second line connected to the crank arm farthest from said line guides and extended over said guides, means to direct said second line for pulling said crank arm in a direction away from said line guides, and a third line connected to the crank arm link nearest to said guides for exerting turning force oppositely to the force exerted by said second line.

3. A Venetian blind structure comprising, channeled guide way means adapted to be mounted across a building opening to be served by the blind structure, slat carriers supported on and being slidable along said guide way means, turnable slat suspending elements journalled in the respective carriers about vertical axes, crank members on said suspending elements for imparting turning motion to said members, a pair of pivoted links between each pair of adjacent elements, a pair of pivoted links between each pair of adjacent crank members, each of said pairs of links being disposed at an angle when said carriers are extended over said guide way means and being foldable upon one another as said carriers are stacked together, and manipulating lines connected to at least one of said suspending elements and crank members for respectively pulling and turning said suspending elements, said manipulating lines including a first line connected to the stem farthest from side of the opening where said blind is gathered to be pulled toward said side for gathering the blind off said opening, a second line connected to the crank arm on said farthest stem and guided to exert a pull away from said side of said opening to spread said blind over said opening and to turn said crank arms into overlapping positions, and a third line connected to the crank arm nearest to said side of said opening for turning the cranks to slat opening positions.

4. A Venetian blind structure comprising, channeled guide way means adapted to be mounted across a building opening to be served by the blind structure, slat carriers supported on and being slidable along said guide way means, turnable slat suspending elements journalled in the respective carriers about vertical axes, crank members on said suspending elements for imparting turning motion to said members, a pair of pivoted links between each pair of adjacent elements, a pair of pivoted links between each pair of adjacent crank members, each of said pairs of links being disposed at an angle when said carriers are extended over said guide way means and being foldable upon one another as said carriers are stacked together, and manipulating lines connected to at least one of said suspending elements and crank members for respectively pulling and turning said suspending elements, said manipulating lines including a first line connected to the stem farthest from side of the opening where said blind is gathered to be pulled toward said side for gathering the blind off said opening, a second line connected to the crank arm on said farthest stem and guided to exert a pull away from said side of said opening to spread said blind over said opening and to turn said crank arms into overlapping positions, and a third line connected to the crank arm nearest to said side of said opening for turning the cranks to slat opening positions, and pulleys adjacent said side of said structure opening, said lines being played over said pulleys and extending downwardly for manipulation.

5. The combination with a guideway for suspending vertical Venetian blind slats and manipulating device for turning and sliding said slats with respect to said guideway; of Venetian blind slats of generally concavo-convex cross section, upwardly converging edges at the top of each slat for permitting overlapping of the slats in closed stacked positions, a suspension pivot element adapted to be slidably and turnably suspended from said guideway, said slat having a hole through said top thereof, and a hook on each suspension pivot element engageable with said hole, a crank arm extended laterally from each element above said guideway, a pair of links connecting adjacent stems at their portions between said crank arm and said guideway, and a pair of links connecting adjacent crank arms, and means to connect said links in series to said respective manipulating devices respectively for turning said slats simultaneously and for gathering or spreading said slats longitudinally of said guideway.

References Cited in the file of this patent

UNITED STATES PATENTS

| Number | Name | Date |
|---|---|---|
| 2,030,234 | Villalobos | Feb. 11, 1936 |
| 2,135,647 | Streby | Nov. 8, 1938 |
| 2,158,454 | Zubiria | May 16, 1939 |
| 2,422,407 | Green | June 17, 1947 |
| 2,529,714 | Turkowsky | Nov. 14, 1950 |
| 2,556,942 | Reimuller | June 12, 1951 |